United States Patent
Lim et al.

(10) Patent No.: US 9,853,667 B2
(45) Date of Patent: Dec. 26, 2017

(54) NOISE AND INTERFERENCE ESTIMATION FOR COLLIDING NEIGHBOR REFERENCE SIGNALS

(71) Applicant: Apple Inc., Cupertino, CA (US)

(72) Inventors: Junsung Lim, San Jose, CA (US); Rati Agrawal, Santa Clara, CA (US); Sami M. Almalfouh, San Jose, CA (US); Johnson O. Sebeni, Fremont, CA (US); Swapna V. Iyer, San Jose, CA (US); Kanagaraj Porur Damodaran, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/163,788

(22) Filed: May 25, 2016

(65) Prior Publication Data

US 2017/0346518 A1    Nov. 30, 2017

(51) Int. Cl.
| | |
|---|---|
| *H04B 1/12* | (2006.01) |
| *H04B 1/10* | (2006.01) |
| *H04W 24/08* | (2009.01) |
| *H04B 17/309* | (2015.01) |

(52) U.S. Cl.
CPC .............. *H04B 1/12* (2013.01); *H04B 1/1027* (2013.01); *H04B 17/309* (2015.01); *H04W 24/08* (2013.01)

(58) Field of Classification Search
CPC ........ H04B 1/10–1/14; H04B 17/309–17/345; H04B 1/1027; H04W 24/08
See application file for complete search history.

(56) References Cited

U.S. PATENT DOCUMENTS

| | | | |
|---|---|---|---|
| 2010/0023830 A1* | 1/2010 | Wengerter | H04L 1/0025 714/748 |
| 2010/0195614 A1* | 8/2010 | Nimbalker | H04W 72/1289 370/330 |
| 2011/0190026 A1* | 8/2011 | Nishikawa | H04W 52/08 455/522 |
| 2012/0113844 A1* | 5/2012 | Krishnamurthy | H04L 1/0026 370/252 |
| 2013/0114482 A1* | 5/2013 | Oh | H04L 12/6418 370/310 |
| 2014/0148149 A1* | 5/2014 | Kwan | H04W 24/08 455/422.1 |
| 2014/0233457 A1 | 8/2014 | Koutsimanis et al. | |

(Continued)

FOREIGN PATENT DOCUMENTS

WO    WO2014117849 A1    8/2014

*Primary Examiner* — Gennadiy Tsvey
(74) *Attorney, Agent, or Firm* — Meyertons Hood Kivlin Kowert & Goetzel, P.C.; Jeffrey C. Hood

(57) ABSTRACT

This disclosure relates to techniques for estimating noise and interference in a wireless communication system in which neighbor and serving cell reference signals are colliding. A wireless device and a base station may establish a wireless communication link such that the base station acts as a serving cell to the wireless device. It may be determined that one or more neighboring cells have colliding reference signals with the serving cell. Neighbor load conditions may be determined. A neighbor reference signal interference cancellation policy may be selected based at least in part on the determined neighbor load conditions and the one or more neighboring cells having colliding reference signals with the serving cell.

20 Claims, 12 Drawing Sheets

(56) References Cited

U.S. PATENT DOCUMENTS

2014/0301272 A1 10/2014 Vajapeyam et al.
2015/0156787 A1* 6/2015 Du .................... H04W 72/1231
   370/329
2016/0173148 A1 6/2016 Kazmi et al.

* cited by examiner

| CQI Index | Modulation | Code Rate x 1024 | Efficiency |
|---|---|---|---|
| 0 | Out of Range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 9

| CQI Index | Modulation | Code Rate x 1024 | Efficiency |
|---|---|---|---|
| 0 | Out of Range | | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 16QAM | 466 | 2.7305 |
| 8 | 16QAM | 567 | 3.3223 |
| 9 | 16QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

FIG. 10

| MCS Index | Modulation | Efficiency | Comments |
|---|---|---|---|
| 0 | 2 | 0.2344 | from CQI table (2) |
| 1 | 2 | 0.3057 | Average Efficiency |
| 2 | 2 | 0.377 | from CQI table (3) |
| 3 | 2 | 0.4893 | Average Efficiency |
| 4 | 2 | 0.6016 | from CQI table (4) |
| 5 | 2 | 0.7393 | Average Efficiency |
| 6 | 2 | 0.877 | from CQI table (5) |
| 7 | 2 | 1.0264 | Average Efficiency |
| 8 | 2 | 1.1758 | from CQI table (6) |
| 9 | 2 | 1.3262 | Average Efficiency |
| 10 | 4 | 1.3262 | overlap |
| 11 | 4 | 1.4766 | from CQI table (7) |
| 12 | 4 | 1.69535 | Average Efficiency |
| 13 | 4 | 1.9141 | from CQI table (8) |
| 14 | 4 | 2.1602 | Average Efficiency |
| 15 | 4 | 2.4063 | from CQI table (9) |
| 16 | 4 | 2.5684 | Average Efficiency |
| 17 | 6 | 2.5684 | overlap |
| 18 | 6 | 2.7305 | from CQI table (11) |
| 19 | 6 | 3.0264 | Average Efficiency |
| 20 | 6 | 3.3223 | from CQI table (12) |
| 21 | 6 | 3.6123 | Average Efficiency |
| 22 | 6 | 3.9023 | from CQI table (13) |
| 23 | 6 | 4.21285 | Average Efficiency |
| 24 | 6 | 4.5234 | from CQI table (14) |
| 25 | 6 | 4.8193 | Average Efficiency |
| 26 | 6 | 5.1152 | from CQI table (15) |
| 27 | 6 | 5.33495 | Average Efficiency |
| 28 | 6 | 5.5547 | from CQI table (16) |

FIG. 11

NOISE AND INTERFERENCE ESTIMATION FOR COLLIDING NEIGHBOR REFERENCE SIGNALS

FIELD

The present application relates to wireless devices, and more particularly to systems, methods, and apparatuses for estimating noise and interference in a wireless communication system in which neighbor and serving cell reference signals are colliding.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

Reference signals are commonly used in conjunction with wireless communication technologies, for a variety of purposes, such as channel estimation, noise and interference estimation, etc. A common underlying assumption when using reference signals may be that the reference signals are expected to experience the same channel characteristics as data signals. However, this may not always be the case. If the reference signals do not represent the actual characteristics of the data signals and no adjustment is made for the difference(s) between the reference and data signal characteristics, the usefulness and suitability of the reference signal may be diminished. Accordingly, improvements in the field would be desirable.

SUMMARY

Embodiments are presented herein of, inter alia, systems, methods, and apparatuses for estimating noise and interference in a wireless communication system in which neighbor and serving cell reference signals are colliding.

In some wireless communication systems, it may be possible for neighboring cells to provide colliding reference signals, for example such that the time and frequency resources used to provide the reference signals are the same for both cells. The reference signals from each cell may thus cause interference with respect to the reference signals of the other cell. In such a scenario, the interference caused to a wireless device served by a cell with such a neighbor cell may or may not be representative of channel conditions for data signals, e.g., depending on whether the neighbor cell is fully loaded, partially loaded, lightly loaded, etc.

Accordingly, this disclosure describes, inter alia, techniques for a wireless device to determine whether the interference caused by a neighbor with colliding reference signals is representative of current channel conditions, and (e.g., since the neighbor reference signals may also be known and thus cancelable) performing interference cancellation on the reference signals received from the serving cell to remove such interference when doing so would provide a more accurate depiction of actual data channel conditions.

Note that the techniques described herein may be implemented in and/or used with a number of different types of devices, including but not limited to, base stations, access points, cellular phones, portable media players, tablet computers, wearable devices, and various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which:

FIGS. 9-11 illustrate exemplary lookup tables for determining spectral efficiency values implied by CQI index and MCS grant values, according to some embodiments;

Figure 1:
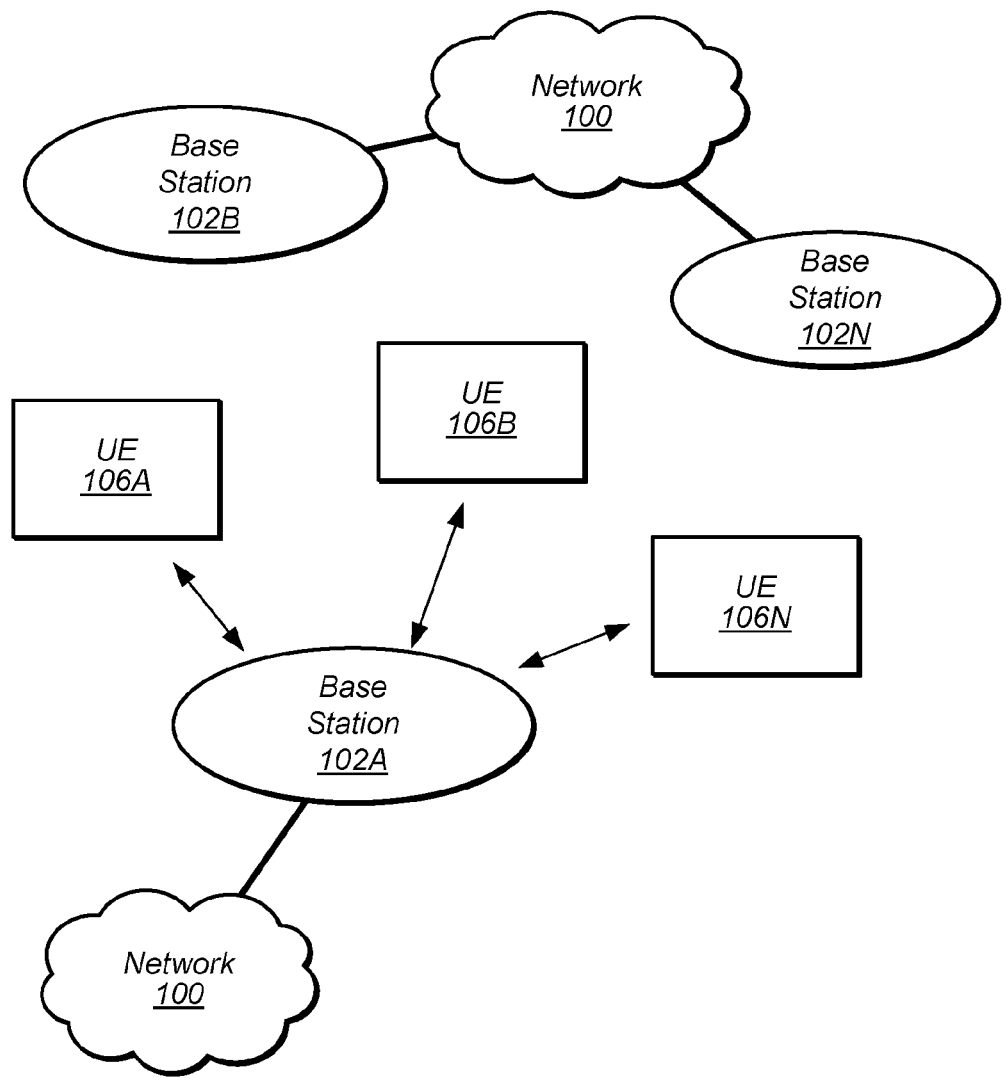
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Base Station—The term "Base Station" has the full breadth of its ordinary meaning, and at least includes a wireless communication station installed at a fixed location and used to communicate as part of a wireless telephone system or radio system.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
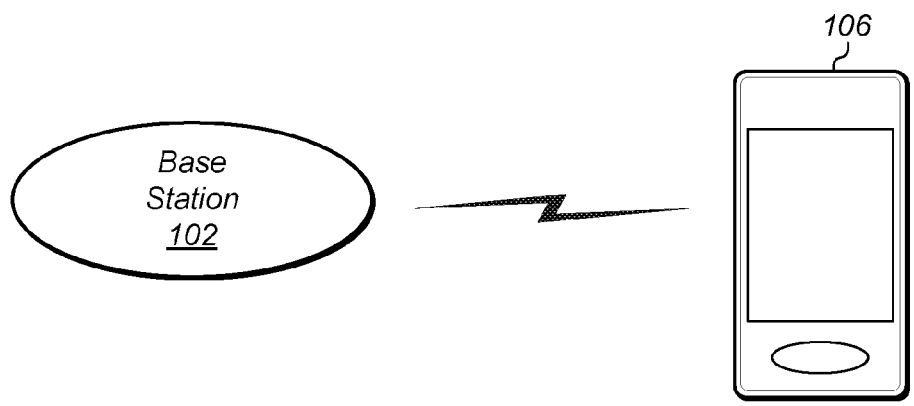
FIG. 2 illustrates a base station (BS) in communication with a user equipment (UE) device, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100, according to the same wireless communication technology as base station 102A and/or any of various other possible wireless communication technologies. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or UMTS or GSM), and separate radios for communicating using each of Wi-Fi and Bluetooth. Other configurations are also possible.

Figure 3:
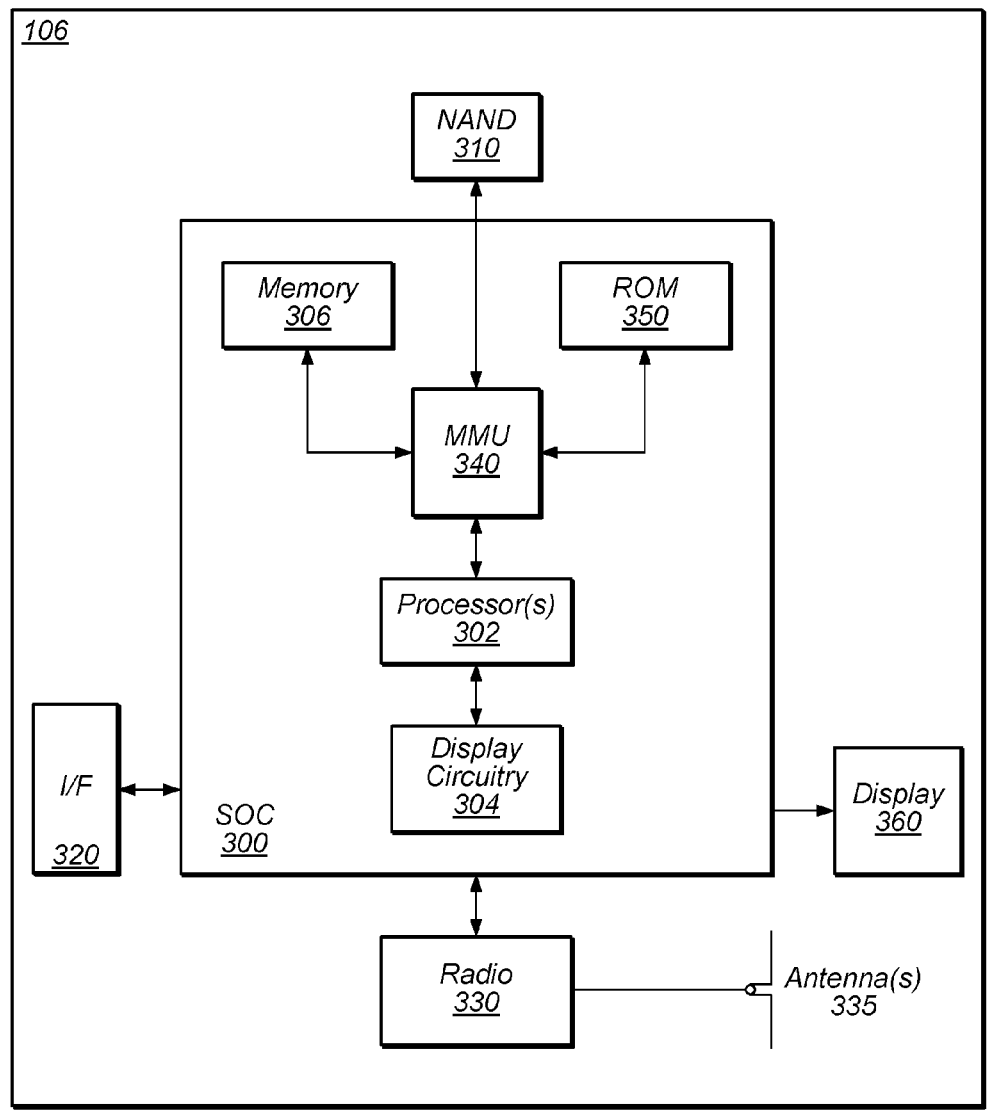
FIG. 3 illustrates an exemplary block diagram of a UE device, according to some embodiments.

FIG. 3—Exemplary Block Diagram of a UE Device

FIG. 3 illustrates an exemplary block diagram of a UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., radio) 330 (e.g., for LTE, Wi-Fi, GPS, etc.).

The UE device 106 may include at least one antenna, (and possibly multiple antennas, e.g., for MIMO and/or for implementing different wireless communication technologies, among various possibilities) performing wireless communication with base stations and/or other devices. For example, the UE device 106 may use antenna(s) 335 to perform the wireless communication. As noted above, the UE 106 may be configured to communicate wirelessly using multiple wireless communication technologies in some embodiments.

As described further subsequently herein, the UE 106 may include hardware and software components for implementing features for estimating noise and interference in a wireless communication system in which neighbor and serving cell reference signals are colliding, such as those described herein with reference to, inter alia, FIG. 5. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 5.

Figure 4:
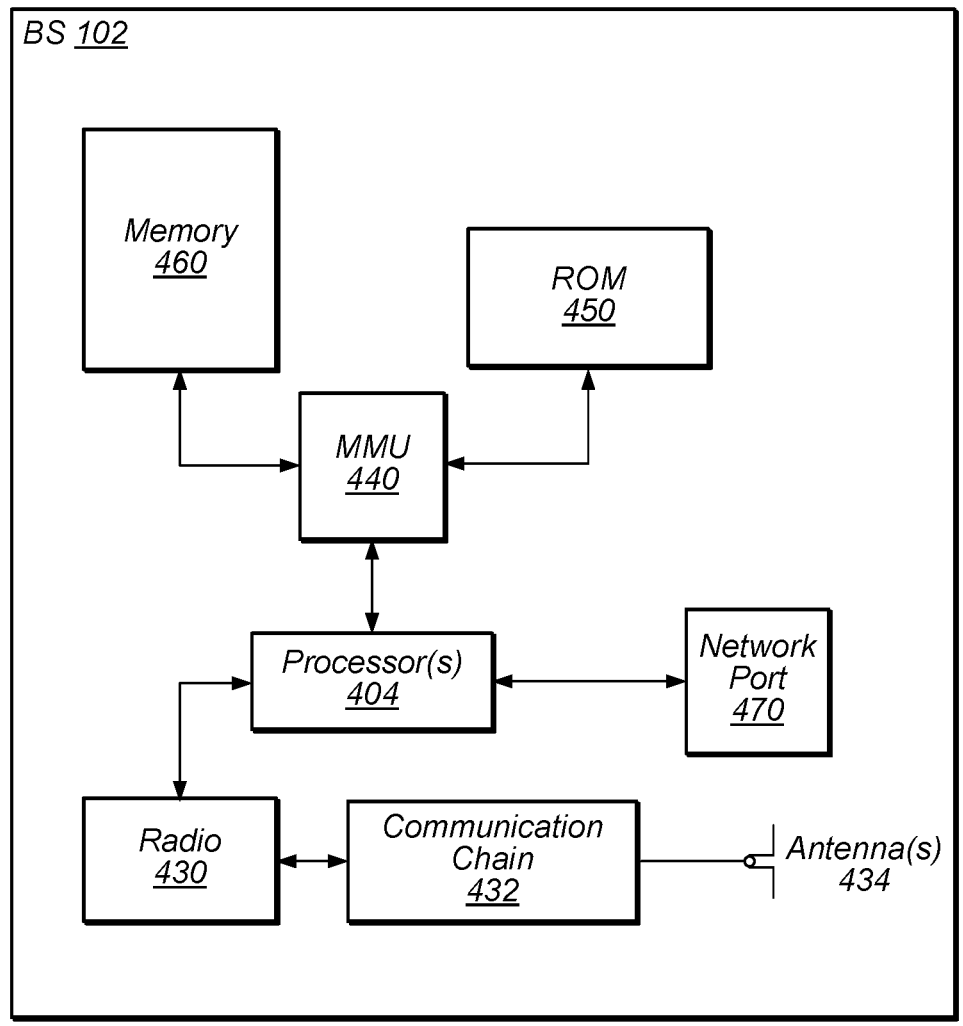
FIG. 4 illustrates an exemplary block diagram of a BS, according to some embodiments.

FIG. 4—Exemplary Block Diagram of a Base Station

FIG. 4 illustrates an exemplary block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi).

The BS 102 may include hardware and software components for implementing or supporting implementation of features described herein. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement part or all of the features described herein.

Figure 5:
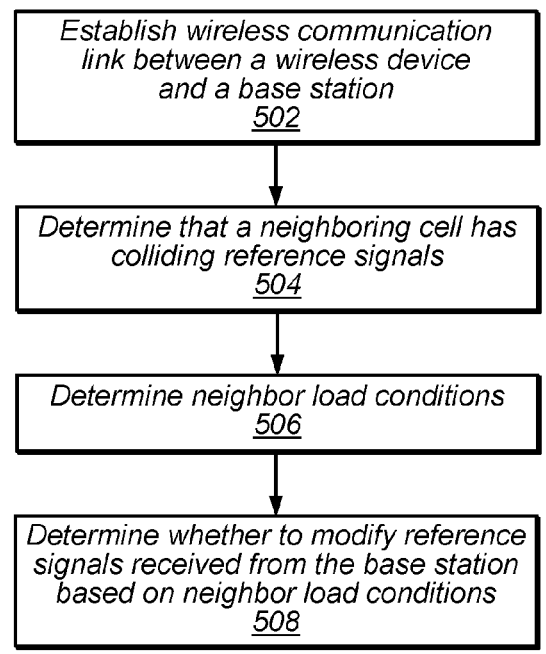
FIG. 5 is a flowchart diagram illustrating an exemplary method for selecting a reference signal interference cancellation policy, according to some embodiments.

FIG. 5—Flowchart Diagram

Reference signals (e.g., including pilot symbols) are a common part of modern wireless communication, and are used for a variety of purposes. For example, in many cellular communication systems, base stations may rely on channel quality reports from wireless devices that are prepared based on reference signals provided by the base station. Wireless devices may also use such reference signals to measure/estimate various statistics such as noise and interference, doppler, antenna correlation, etc. Such estimated values may be used by demodulators to improve a receiver's performance when demodulating data signals associated with the reference signals.

Since the data gleaned from the reference signals may be used to enable and improve the quality of communication of data signals, an implicit expectation underpinning the usefulness of reference signals may be that the reference signals experience the same channel characteristics as the data signal, e.g., such that channel conditions measured or estimated on the basis of the reference signals may be considered representative of the data channel conditions. Thus, if circumstances occur that cause a reference signal to no longer represent the actual characteristics of an associated data signal, the usefulness of the reference signal may be diminished, possibly to a point where the estimated values derived from the reference signal are no longer suitable for demodulating associated data signals.

As one example of a metric that may be estimated from reference signals, noise and interference (NI) power may be a key factor driving receiver performance, at least according to some embodiments, and may be relatively sensitive to estimation error. In LTE, NI may be estimated using cell-specific reference signals (CRS), which may be provided using dedicated resource elements (REs) whose time and frequency can be determined in advance (e.g., by way of one or more of specification reference documents, broadcast system information, configuration information, etc.). The estimated NI value may be used to demodulate data signals (e.g., provided on the physical downlink shared channel (PDSCH) in LTE), which may be associated with different time and frequency resources (e.g., different REs).

While in many cases neighboring cells may be configured to provide reference signals using different time and/or frequency resources, such that their respective reference signals do not (or rarely) collide, it may also be possible in some cases for neighboring cells to use the same time and frequency resources for their reference signals. For example, in LTE it may be possible for a serving cell to have a "colliding CRS neighbor", meaning that all CRS REs for the serving cell collide with CRS REs for the colliding CRS neighbor. In such a case, the serving cell CRS REs may experience a constant level of interference from the neighbor cell CRS. However, the interference experienced by PDSCH REs may be dependent on the actual neighbor load. For example, if the neighbor load is light, PDSCH REs may experience little or no interference from the neighbor cell, while if the neighbor load is heavy, the PDSCH REs may experience more substantial interference from the neighbor cell. Thus, under light neighbor loading conditions in such a scenario, the metrics estimated on the basis of the reference signals may not be representative of actual data channel conditions.

Accordingly, it would be useful to provide techniques for determining when reference signals are not representative of data channel conditions, and for improving performance under such circumstances. FIG. 5 is a flowchart diagram illustrating such a scheme. The scheme shown in FIG. 5 may be used in conjunction with any of the computer systems or devices shown in the above Figures, among other devices. According to some embodiments, the method may be implemented by a wireless device (e.g., a UE 106 such as illustrated in and described with respect to FIGS. 1-3). In various embodiments, some of the elements of the scheme shown may be performed concurrently, in a different order than shown, substituted for by other elements, or may be omitted. Additional elements may also be performed as desired. As shown, the scheme may operate as follows.

In 502, a wireless communication link may be established between a wireless device and a base station. The wireless communication link may be established according to a first wireless communication technology (or "radio access technology" or "RAT"), such as LTE, UMTS, CDMA2000, etc. According to some embodiments, establishing the radio link may include any or all of acquiring system information for a cell deployed by a public land mobile network (PLMN), performing an attach procedure to attach to the PLMN by way of the cell (e.g., such that the cell acts as a serving cell for the wireless device), and establishing a radio resource control (RRC) connection with the serving cell. The serving cell may be provided by the base station, which may be operated by the PLMN.

The wireless device and the cellular base station may perform control and data communication via the radio link. For example, in LTE, a base station may provide control signals via a physical downlink control channel (PDCCH) and may provide data signals via a physical downlink shared channel (PDSCH), according to some embodiments. In addition, the base station may provide reference signals (e.g., to assist with channel estimation, radio link monitoring, etc.), such as CRS, to the wireless device (and possibly to other wireless devices in communication with the base station).

The wireless communication link may provide the wireless device with a communication link to a cellular network, such as a core network of a cellular service provider (e.g., with which a user of the wireless device may have a subscription and/or other agreement to provide cellular service). The cellular network may thus provide connectivity between the user device and various services and/or devices coupled to the cellular network, such as other user devices, a public switched telephone network, the Internet, various cloud-based services, etc. A variety of possible data types, with different characteristics, may be transmitted using the wireless communication link. In addition, various signaling messages may be exchanged at various times to establish, maintain, reconfigure, and/or otherwise provide signaling functionality for the wireless communication link and the layers and protocols supporting the wireless communication link.

In 504, the wireless device may determine that a neighboring cell has colliding reference signals. For example, the neighboring cell may be a colliding CRS neighbor. The wireless device may determine that the neighboring cell has colliding reference signals based on acquiring the cell identification number of the neighbor cell (e.g., detecting Primary/Secondary Synchronization Signal). As another possibility, the serving cell of the wireless device may inform the wireless device that the neighboring cell has colliding reference signals. The wireless device may also determine what reference signals (e.g., which CRS) are used by the neighbor cell, which may allow the wireless device to reduce or cancel interference effects caused by the colliding reference signals under certain circumstances as described further subsequently herein. In some instances, multiple neighboring cells may have colliding reference signals.

In 506, the wireless device may determine neighbor load conditions. Determining (or estimating) loading conditions for neighboring cells may be performed in any of a variety of ways. According to some embodiments, such a determination may include selecting a neighbor load condition state from two or more possible states (e.g., "heavily loaded" or "lightly loaded", among various possible states) based on one or more indicators of neighbor load conditions. As another possibility, a value along a spectrum (e.g., a percentage between 0-100) that is representative of the current neighbor loading conditions relative to minimum and maximum neighbor loading may be determined. Note that neighbor loading conditions may be determined individually (e.g., per neighbor cell) and/or in combination (e.g., aggregate neighbor loading conditions) for all or for one or more groups of neighboring cells, as desired.

One possible set of techniques for determining neighbor load conditions, e.g., in a scenario in which a serving cell has a neighbor with colliding reference signals, may include a comparison of the spectral efficiency that might be expected (e.g., based on serving cell reference signal measurements) with the spectral efficiency associated with actual downlink data transmission grants. The spectral efficiency associated with actual downlink data transmission grants may be estimated using a lookup table (e.g., based on a granted modulation and coding scheme), or may be calculated (e.g., on a per-transmission time interval basis) based on actual resource elements assigned, transport block assigned, and modulation order assigned for the downlink data transmission grants. The block error rate (BLER) of the data channel (e.g., PDSCH) may also be taken into account in calculating the spectral efficiency.

The wireless device may determine values one or more metrics, such as a channel quality index (CQI) and rank indicator (RI), based on the reference signals provided by the base station. Such metrics may be provided to the base station, e.g., as part of a channel quality report. The base station may determine which modulation and coding scheme (MCS) to use for downlink data transmissions to the wireless device based in part on the channel quality report. Thus, the wireless device may be able to determine (estimate) the MCS and thus spectral efficiency that would be expected based on the metrics reported to the base station.

In addition to the channel quality report, the base station may also consider other metrics when determining the MCS. For example, BLER of the data channel (e.g., PDSCH) may be used to adjust the MCS and rank assigned to the wireless device for downlink data transmissions, such that the actually assigned rank/MCS (and the resulting spectral efficiency of downlink data communication) may be more representative of the data channel quality than an estimate made by the wireless device based solely on the reference signal based metrics reported to the base station.

Thus, if the assigned rank and/or MCS is similar to the rank and/or MCS expected based on the rank indicator and/or CQI in a scenario with colliding reference signals, this may be indicative of relatively heavy loading conditions (e.g., as the interference suffered by the reference signals may be representative of interference suffered due to data transmissions by the relatively heavily loaded neighbor(s)). However, if the assigned rank and/or MCS is higher than the rank and/or MCS expected based on the rank indicator and/or CQI in a scenario with colliding reference signals, this may be indicative of relatively light loading conditions (e.g., the data channel quality may be better than the reference signals that suffer from colliding neighbor reference signal interference would indicate as the data transmissions suffer from little or no interference from the relatively lightly loaded neighbor(s)). The assigned rank/MCS and expected rank/MCS may be compared using estimated or calculated actual spectral efficiency (e.g., derived from the actual assigned rank/MCS) and estimated expected spectral efficiency (e.g., derived from the CQI and RI measured based on the serving cell reference signals), according to some embodiments.

Accordingly, as one specific (non-limiting) example technique for determining neighbor loading conditions, it may be determined that neighbor load conditions are light if the estimated actual spectral efficiency is greater than the estimated expected spectral efficiency by at least a first threshold. Similarly, it may be determined that neighbor load conditions are not light (e.g., are heavy) if the estimated actual spectral efficiency is not greater than the estimated expected spectral efficiency by at least the first threshold.

As further described subsequently herein, under some circumstances the wireless device may at least partially cancel interference effects caused by colliding neighbor reference signals from serving cell reference signals. In such a case, a different technique may be needed to determine neighbor loading conditions, as the (post neighbor cell reference signal interference cancellation) serving cell reference signals may be representative of unloaded neighbor conditions in this case rather than loaded neighbor conditions. For example, as one specific (non-limiting) possible technique for determining neighbor loading conditions when interference cancellation on the reference signals provided by the serving cell to cancel interference from the colliding neighbor reference signals is currently enabled, it may be determined that neighbor load conditions are not light (e.g., are heavy) if the estimated expected spectral efficiency is greater than the estimated actual spectral efficiency by at least a second threshold. Similarly, it may be determined in such a case that neighbor load conditions are light if the estimated expected spectral efficiency is not greater than the estimated actual spectral efficiency by at least the second threshold.

Note that according to some embodiments, the neighbor load conditions determination may be performed over any desired length of time. For example, according to some embodiments, neighbor load conditions may be determined on multiple occasions over a period of time and evaluated over that period of time to determine whether a ping-pong type effect is occurring with respect to the determined neighbor load conditions. Such an evaluation period may help prevent false-positive determinations of light loading conditions, which might negatively affect device performance, at least according to some embodiments.

In 508, the wireless device may determine whether to modify the reference signals received from the base station, and/or may more generally select a neighbor reference signal interference cancellation policy, based at least in part on the determined neighbor load conditions and/or based on the neighboring cell(s) having colliding reference signals with the serving cell. For example, the serving cell reference signals may be modified to reduce interference effects from colliding neighbor reference signals if neighbor load conditions are determined to be light. The serving cell reference signals may be left unmodified (or may be only partially modified) if neighbor load conditions are determined to be heavy (or moderate), according to some embodiments.

According to some embodiments, the determination may also be based at least in part on evaluating the determined neighbor load conditions over a period of time, e.g., for ping-pong effects. For example, if a false positive determination of light loading conditions is detected as a result of such evaluation over a period of time, a waiting period (e.g., enforced using a timer or other mechanism) may be introduced before making any serving cell reference signal modifications even if light loading conditions are detected during the waiting period, e.g., in case the detected light loading conditions are another false positive. Further ping-ponging or other indications of false positive light loading detection may further extend the waiting period, according to some embodiments.

The modification/policy may be a binary selection (or other selection from a number of discrete options), such as a yes/no decision of whether to enable interference cancellation for the serving cell reference signals, according to some embodiments. As another possibility, a variable amount of modification (e.g., interference cancellation) may be selected, for example as a function of the degree to which neighbor cells are loaded.

The potentially modified serving cell reference signals may be used for preparing channel quality reports to be sent to the base station providing the serving cell, according to some embodiments. For example, a channel quality report provided to the base station may be prepared using reference signals provided by the base station with interference caused by reference signals provided by a neighbor cell reduced or cancelled when load conditions for the neighbor cell are light, and a channel quality report provided to the base station may be prepared using reference signals provided by the base station without interference caused by reference signals provided by a neighbor cell reduced or cancelled when load conditions for the neighbor cell are not light.

Similarly, the potentially modified serving cell reference signals may be used for estimating NI for demodulation purposes, according to some embodiments. For example, channel noise and interference power may be estimated using the reference signals provided by the base station with interference caused by reference signals provided by a neighbor cell reduced or cancelled when load conditions for the neighbor cell are light, and may be estimated using the reference signals provided by the base station without interference caused by reference signals provided by a neighbor cell reduced or cancelled when load conditions for the neighbor cell are not light. The wireless device may then perform demodulation of data signals received from the base station using the estimated channel noise and interference power.

Note that as another (additional or alternative) possibility, the wireless device may determine when to enable a neighbor data signal cancellation scheme based at least in part on neighbor load conditions. For example, the wireless device may be capable of estimating and (partially or entirely) cancelling interference caused by neighbor data signals on the data channel used by the serving cell, e.g., using a joint detection or joint demodulation technique. Such techniques may improve performance under heavy neighbor loading conditions, but potentially at a substantial computational (and thus potentially power consumption) expense. The benefits from such techniques may be reduced substantially under lighter neighbor loading conditions, as there may be little or no interference caused by neighbor data signals to cancel, but the computational cost may be similar. Accordingly, it may be beneficial to enable such techniques when heavy load conditions are detected, and to disable such techniques when light load conditions are detected, at least according to some embodiments.

FIGS. 6-16

FIGS. 6-16 and the description thereof are provided by way of example, and are not intended to be limiting to the disclosure as a whole. Numerous alternatives to and variations of the details provided herein below are possible and should be considered within the scope of the present disclosure.

Figure 6:
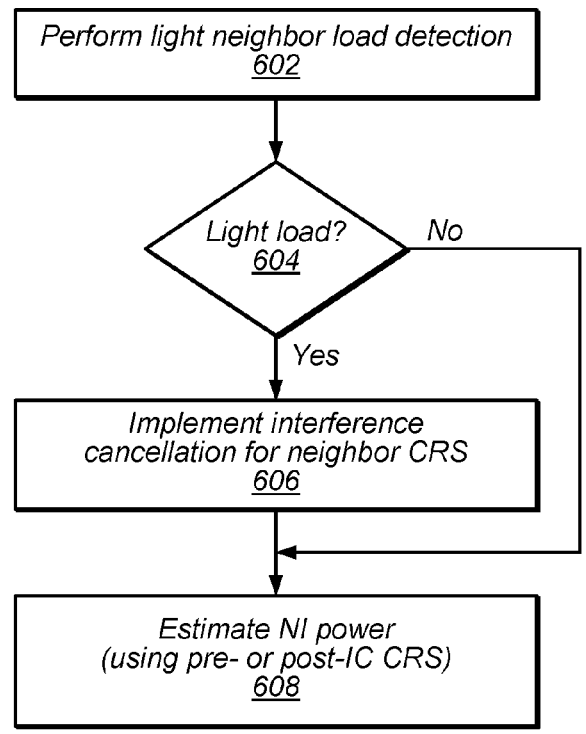
FIGS. 6-8 are flowchart diagrams illustrating possible aspects of the exemplary method of FIG. 5, according to some embodiments.
Figure 7:
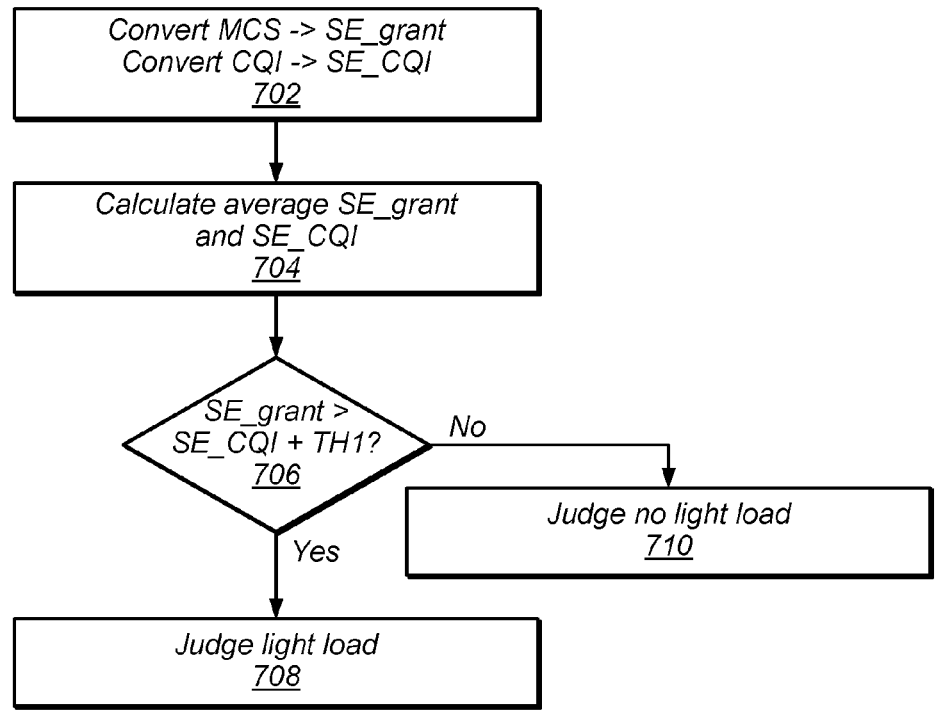
Figure 8:
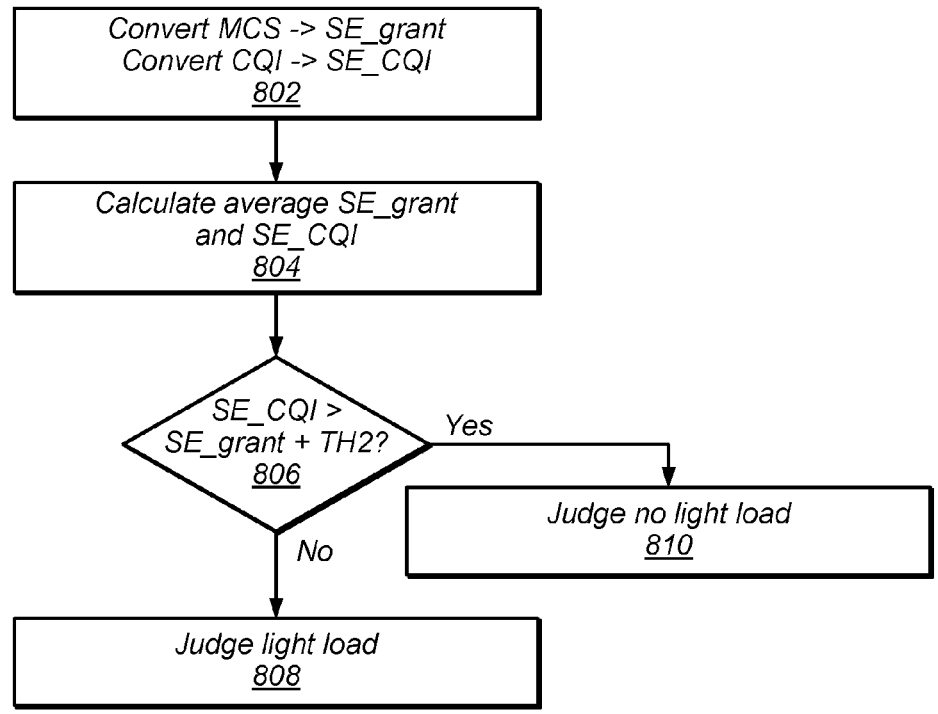

FIGS. 6-8 are flowchart diagrams illustrating additional exemplary possible aspects of the method of FIG. 5, according to some embodiments. The schemes shown in FIGS. 6-8 may be used in conjunction with any of the computer systems or devices shown in the above Figures, among other devices. According to some embodiments, the methods may be implemented by a wireless device (e.g., a UE 106 such as illustrated in and described with respect to FIGS. 1-3). In various embodiments, some of the elements of the scheme shown may be performed concurrently, in a different order than shown, substituted for by other elements, or may be omitted. Additional elements may also be performed as desired.

FIG. 6 is a flowchart diagram illustrating an exemplary technique for estimating noise and interference power, according to some embodiments. As shown, the scheme may operate as follows.

In 602, a light neighbor load detection technique may be performed. According to some embodiments, a scheme such as illustrated in FIG. 7 (e.g., if interference cancellation for neighbor reference signals is not currently implemented) or in FIG. 8 (e.g., if interference cancellation for neighbor reference signals is currently implemented) may be used. Other techniques are also possible.

In 604, if a light neighbor load is detected, the method may proceed to step 606, in which an interference cancellation (IC) scheme for colliding neighbor reference signals may be implemented. If no light neighbor load is detected, the method may proceed to step 608. As shown, the method may also proceed to step 608 from step 606 after interference cancellation is implemented.

In 608, noise and interference power (potentially noise and interference covariance, e.g., if multiple input multiple output (MIMO) is used) may be estimated. The NI estimation may use pre-IC CRS (e.g., if no light load was detected) or post-IC CRS (e.g., if a light load was detected), depending on whether or not step 606 was performed.

FIG. 7 is a flowchart diagram illustrating an exemplary technique for detecting light neighbor load conditions using pre-IC CRS, according to some embodiments. As shown, the scheme may operate as follows.

In 702, the MCS granted by the serving cell of a wireless device for a downlink data transmission may be converted to an estimated actual spectral efficiency ("SE_grant"). The CQI (and potentially also RI) calculated from pre-IC CRS may also be converted to an estimated expected spectral efficiency for downlink data transmissions ("SE_CQI").

In 704, the SE_grant and/or SE_CQI may be averaged over a desired period (e.g., one transmission time interval (TTI), or any other desired period).

In 706, the (e.g., averaged) SE_grant may be compared with the SE_CQI to determine whether SE_grant is greater than SE_CQI by at least a ("first") threshold ("TH1").

If SE_grant is indeed greater than SE_CQI by at least the first threshold, the method may proceed from decision 706 to step 708, in which it may be judged that neighbor load conditions are currently light.

If SE_grant is not greater than SE_CQI by at least the first threshold, the method may proceed from decision 706 to step 710, in which it may be judged that neighbor load conditions are not currently light.

Thus, if the granted MCS (and associated spectral efficiency) is substantially more aggressive than the expected MCS (and associated spectral efficiency) when the CRS does include interference effects from colliding neighbor CRS, it may be determined that light load conditions are present.

FIG. 8 is a flowchart diagram illustrating an exemplary technique for detecting light neighbor load conditions using post-IC CRS, according to some embodiments. As shown, the scheme may operate as follows.

In 802, similar to step 702 of FIG. 7, the MCS granted by the serving cell of a wireless device for a downlink data transmission may be converted to an estimated actual spectral efficiency ("SE_grant"). The CQI (and potentially also RI) calculated from pre-IC CRS may also be converted to an estimated expected spectral efficiency for downlink data transmissions ("SE_CQI").

In 804, the SE_grant and/or SE_CQI may be averaged over a desired period (e.g., one transmission time interval (TTI), or any other desired period).

In 806, the (e.g., averaged) SE_grant may be compared with the SE_CQI to determine whether SE_CQI is greater than SE_grant by at least a ("second") threshold ("TH2"). Note that the second threshold may be the same as or different than the first threshold, as desired.

If SE_CQI is indeed greater than SE_grant by at least the second threshold, the method may proceed from decision 806 to step 810, in which it may be judged that neighbor load conditions are not currently light.

If SE_CQI is not greater than SE_grant by at least the second threshold, the method may proceed from decision 806 to step 808, in which it may be judged that neighbor load conditions are currently light.

Thus, if the granted MCS (and associated spectral efficiency) is comparable with the expected MCS (and associated spectral efficiency) when the CRS does not include interference effects from colliding neighbor CRS, it may be determined that light load conditions are present.

FIGS. 9-11 are tables that may be used as look-up tables for determining/estimating spectral efficiency values associated with CQI and RI values measured from (pre- or post-IC) CRS and for determining/estimating spectral efficiency values associated with granted MCS for downlink data transmissions. For example, the tables of FIGS. 9-11 may be used in conjunction with the methods of FIGS. 7-8 as part of a technique for determining current neighbor load conditions, according to some embodiments.

More particularly, FIG. 9 illustrates a table that may be used to look up SE values for various CQI index values when reporting CQI based on QPSK, 16QAM and 64QAM, while FIG. 10 illustrates a table that may be used to look up SE values for various CQI index values when reporting CQI based on QPSK, 16QAM, 64QAM and 256QAM.

FIG. 11 illustrates a table that may be used to look up SE values for various MCS index values. Note that the SE values from FIG. 11 may be derived from the CQI tables of FIGS. 9-10 and/or may be interpolated or averaged from values derived from the CQI tables of FIGS. 9-10, as one possibility. Such a look up table may be used to estimate actual SE using certain (e.g., typical) assumptions, in some embodiments; for example, as one possibility, 24 bit CRS, 3 PDCCH symbols, 2 antennas, and up to 64 QAM may be assumed with respect to the example table of FIG. 11. Note that other look up tables may (e.g., alternatively or additionally) be used, e.g., for other configurations/assumptions.

Figure 12:
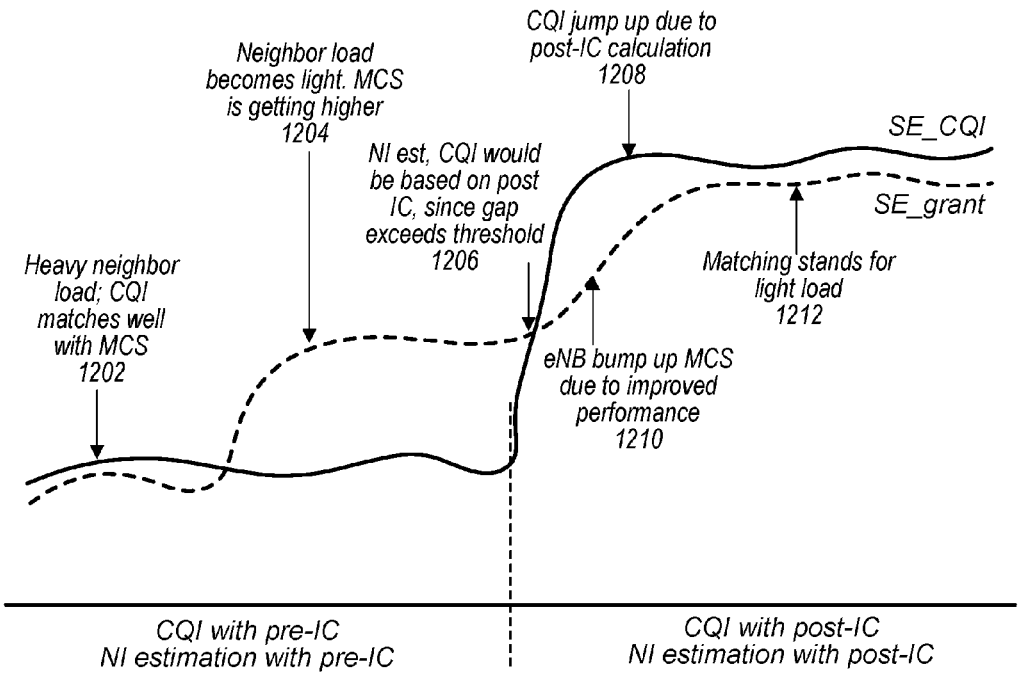
FIGS. 12-13 are graphs illustrating spectral efficiency based on measured CQI index and granted MCS values over time under various possible scenarios, according to some embodiments.
Figure 13:
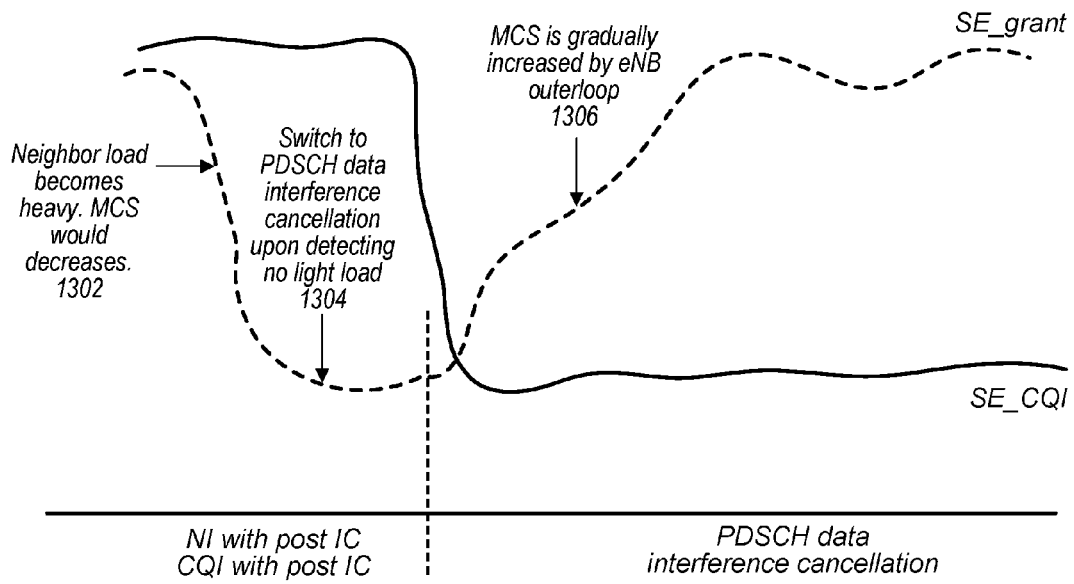

FIGS. 12-13 are graphs illustrating spectral efficiency based on measured CQI index and granted MCS values over time under different scenarios with a colliding CRS neighbor.

In the example scenario of FIG. 12, CQI and NI may initially be calculated using pre-IC CRS. At 1202, SE_CQI may approximate SE_grant, as neighbor loading may be relatively heavy. At 1204, as the neighbor load becomes lighter, MCS granted becomes higher, and thus so does SE_grant. At 1206, the difference between SE_grant and SE_CQI may be sufficient to trigger light load detection, which may in turn trigger implementation of interference cancellation for the CRS and calculation of CQI and NI using the post-IC CRS. By 1208, reported CQI may jump substantially due to the use of post-IC CRS in its calculation. In 1210, it can be seen that the base station (eNB) may bump up the granted MCS due to the improved performance reflected by the higher CQI. In 1212, the SE_CQI and SE_grant may stabilize at similar levels, as neighbor loading may remain relatively light.

In the example scenario of FIG. 13, CQI and NI may initially be calculated using post-IC CRS, for example due to previous detection of light neighbor loading. In 1302, however, neighbor load may become heavy, and the MCS granted by the base station may decrease. In 1304, the wireless device may detect that neighbor loading is no longer light, and as a result may determine to enable PDSCH data interference cancellation, e.g., to cancel interference caused by neighbor data (and potentially other) signals. In 1306, the granted MCS may gradually be increased (e.g., due to eNB outer loop adjustments) as the neighbor data signal interference cancellation technique improves serving cell data channel performance. Note that according to some embodiments, SE_CQI may remain relatively low compared to SE_grant when such neighbor data signal interference cancellation techniques are implemented, e.g., if pre-IC CRS are used to calculate CQI in such conditions.

Figure 14:
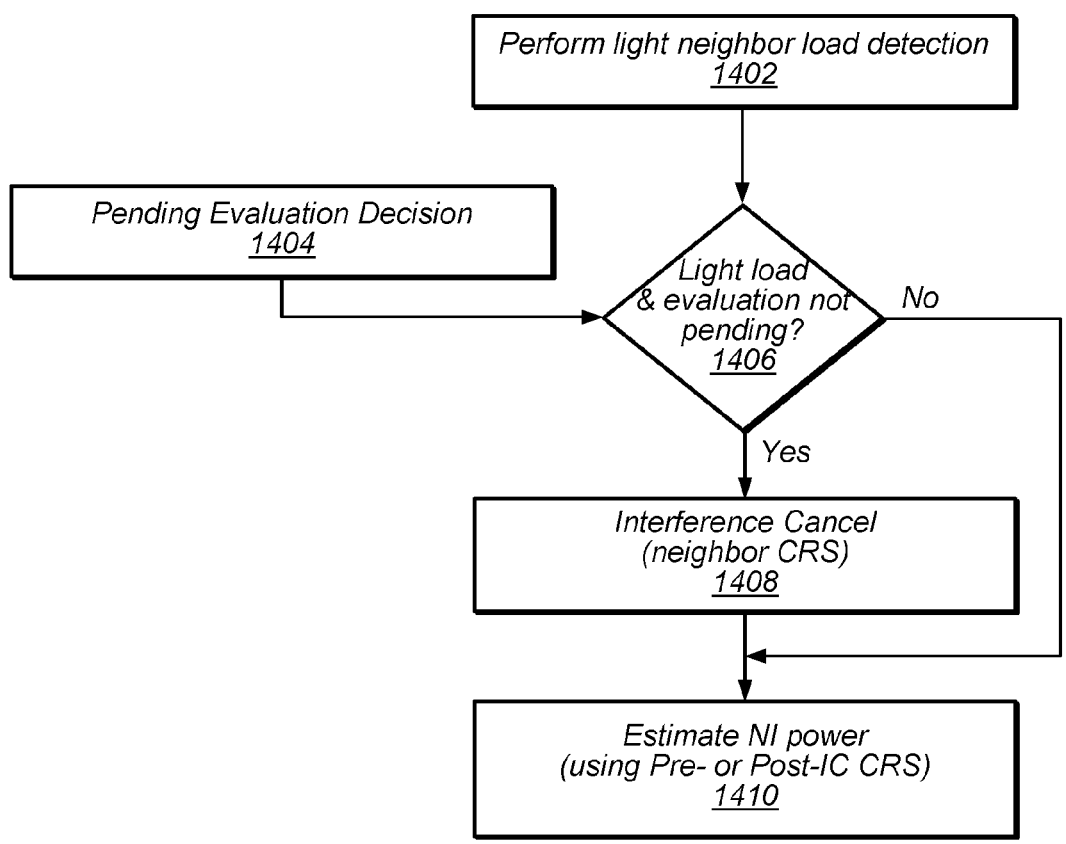
FIGS. 14-15 are flowchart diagrams illustrating further possible aspects of the exemplary method of FIG. 5, according to some embodiments.
Figure 15:
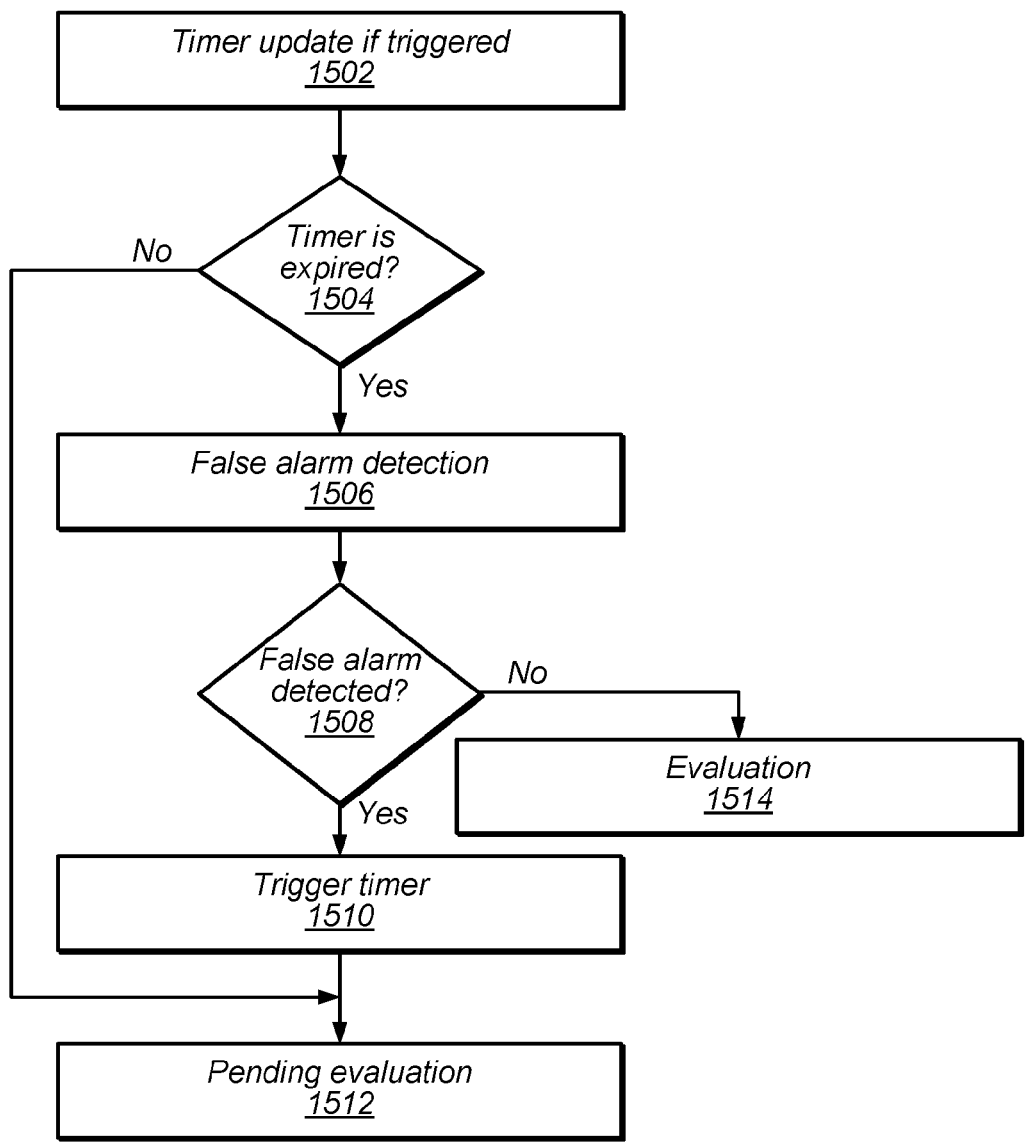

FIGS. 14-15 are flowchart diagrams illustrating further additional exemplary possible aspects of the method of FIG. 5, according to some embodiments. The schemes shown in FIGS. 6-8 may be used in conjunction with any of the computer systems or devices shown in the above Figures, among other devices. According to some embodiments, the methods may be implemented by a wireless device (e.g., a UE 106 such as illustrated in and described with respect to FIGS. 1-3). In various embodiments, some of the elements of the scheme shown may be performed concurrently, in a different order than shown, substituted for by other elements, or may be omitted. Additional elements may also be performed as desired.

FIG. 14 is a flowchart diagram illustrating an exemplary technique for estimating noise and interference power similar to the technique of FIG. 6, with an extension for pending evaluation of whether light neighbor load conditions are present over a certain time duration. As shown, the scheme may operate as follows.

In 1402, a light neighbor load detection technique may be performed. According to some embodiments, a scheme such as illustrated in FIG. 7 (e.g., if interference cancellation for neighbor reference signals is not currently implemented) or in FIG. 8 (e.g., if interference cancellation for neighbor reference signals is currently implemented) may be used. Other techniques are also possible.

In 1404, a 'pending evaluation decision' condition may be considered to help detect and prevent false alarm detection of light neighbor loading conditions. According to some embodiments, while pending evaluation decision is true, the wireless device may still determine whether light loading conditions are detected (e.g., according to step 1402), but may not (yet) act on the detection. If the pending evaluation is not true (evaluation is allowed), colliding neighbor reference signal interference cancellation may (e.g., depending on whether light neighbor load conditions are present). The pending evaluation decision may be performed according to the method of FIG. 15, as subsequently described herein, according to some embodiments. Other techniques for evaluating neighbor load conditions over time prior to acting on those load conditions are also possible.

Thus, in 1406, if a light neighbor load is detected, and if evaluation is not pending, the method may proceed to step 1408, in which an IC scheme for colliding neighbor reference signals may be implemented. If no light neighbor load is detected or if evaluation is pending, the method may proceed to step 1410. As shown, the method may also proceed to step 1410 from step 1408 after interference cancellation is implemented.

In 1410, noise and interference power (potentially noise and interference covariance, e.g., if multiple input multiple output (MIMO) is used) may be estimated. The NI estimation may use pre-IC CRS or post-IC CRS, e.g., depending on whether or not step 1408 was performed.

FIG. 15 is a flowchart diagram illustrating an exemplary technique determining when and when not to act on light neighbor load conditions being detected, such as might be used in conjunction with FIG. 14, according to some embodiments. As shown, the scheme may operate as follows.

In 1502, a 'pending evaluation' timer update may be performed if triggered, e.g., according to step 1510 as subsequently described herein.

In 1504, it may be determined if the pending evaluation timer is expired. If the timer is not expired, the method may proceed directly to step 1512, in which it may be determined that evaluation of neighbor load conditions remains pending. If the pending evaluation timer is expired, the method may proceed from step 1504 to step 1506.

In 1506, it may be determined if any 'false alarm' light neighbor load conditions are detected. One possible condition indicating a false alarm may include a recent 'ping-pong' in neighbor load conditions, e.g., such that the last three neighbor load condition detections resulted in no light load, then light load, then no light load being detected in sequence. Another possible condition indicating a false alarm may include BLER being above a desired threshold after post-IC NI estimation. Other possible conditions indicating false alarm light neighbor load conditions detection may be defined and used as desired.

In decision 1508, if no false alarm is detected, the method may proceed to step 1514, in which evaluation of neighbor load conditions is allowed (evaluation is no longer pending). However, if a false alarm is detected, the method may proceed to step 1510, in which the pending evaluation timer may be triggered (e.g., reset), and the method may proceed to step 1512, in which it may be determined that evaluation of neighbor load conditions remains pending.

Figure 16:
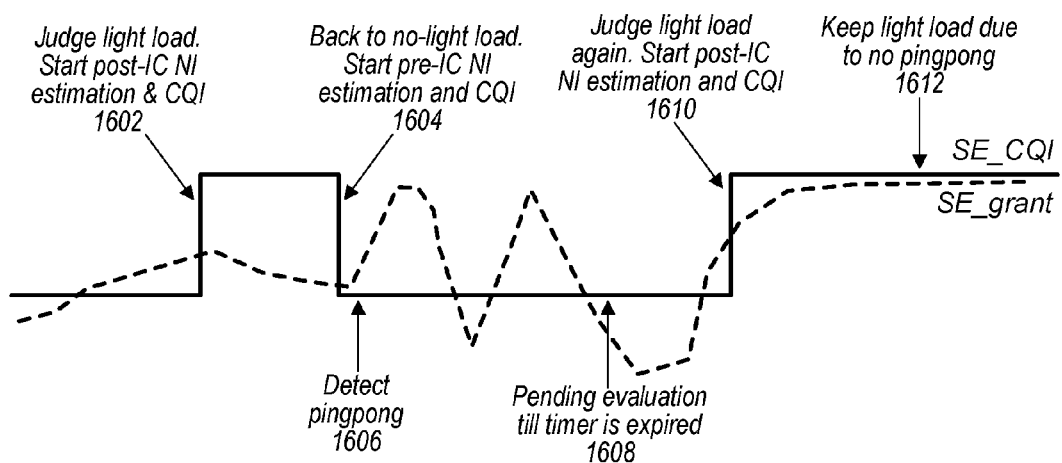
FIG. 16 is a graph illustrating spectral efficiency based on measured CQI index and granted MCS values over time under a further possible scenario, according to some embodiments.

FIG. 16 is a graph illustrating spectral efficiency based on measured CQI index and granted MCS values over time under a scenario with a colliding CRS neighbor in which a pending evaluation timer such as described herein with respect to FIGS. 14-15 may be implemented.

In the example scenario of FIG. 16, CQI and NI may initially be calculated using pre-IC CRS. In 1602, as SE_grant rises above SE_CQI, neighbor load conditions may be judged to be light and post-IC NI estimation and CQI calculation may be initiated.

However, in 1604, as SE_grant falls below the (now boosted) SECQI, neighbor load conditions may be judged to be not-light and pre-IC NI estimation and CQI calculation may again be used.

In 1606, as SE_grant again rises above SE_CQI, neighbor load conditions may be judged to be light, but a ping-pong pattern may be detected, so a pending evaluation timer may be initiated and pre-IC CRS may continue to be used for NI and CQI purposes.

In 1608, evaluation may continue to be pending through a period of volatility of SE_grant, until the pending evaluation timer expires.

In 1610, as SE_grant again rises above SE_CQI and the pending evaluation timer has expired, neighbor load conditions may again be judged to be light, and post-IC NI estimation and CQI calculation may be again be initiated.

In 1612, as SE_grant and SECQI stabilize and no further pingponging is detected, light load conditions may continue to be considered in effect, and post-IC CRS may continue to be used for NI estimation and CQI calculation.

Note that while use of a pending evaluation procedure such as illustrated in and described with respect to FIGS. 14-16 may be optional (at least according to some embodiments), such a technique may help avoid incorrect (false alarm) light loading decisions, which might otherwise result in performance degradation if NI estimation and CQI/RI calculation were performed using post-IC CRS under heavy loading conditions.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising a processing element and a memory medium configured to cause a wireless device to:
  establish a wireless communication link with a base station, wherein the base station provides a serving cell to the wireless device;
  determine that one or more neighboring cells have colliding reference signals with the serving cell;
  determine a channel quality index (CQI) value and a rank indicator (RI) value for the serving cell based at least in part on cell-specific reference signals (CRS) provided by the serving cell;
  estimate an expected spectral efficiency using the CQI value and the RI value:
  receive a modulation and coding scheme (MCS) assignment from the base station;
  estimate an actual spectral efficiency using the MCS assignment;
  perform a comparison using the estimated expected spectral efficiency and the estimated actual spectral efficiency;
  determine that load conditions for the neighboring cell are light if the estimated actual spectral efficiency is greater than the estimated expected spectral efficiency by at least a first threshold and if interference cancellation on the CRS provided by the serving cell to cancel interference from the CRS provided by the neighboring cell is not currently enabled; and
  select a neighbor reference signal interference cancellation policy based at least in part on the determined load conditions for the neighboring cell and the one or more neighboring cells having colliding reference signals with the serving cell.

2. The apparatus of claim 1,
  wherein the estimated actual spectral efficiency is estimated using a lookup table based on the MCS assignment.

3. The apparatus of claim 1,
  wherein the estimated actual spectral efficiency is calculated using resource elements assigned, transport block size assigned, and modulation order assigned to the wireless device for one or more downlink data transmission grants.

4. The apparatus of claim 1,
  wherein the neighbor reference signal interference cancellation policy selected comprises cancelling interference estimated to be caused by a neighboring cell having colliding reference signals from serving cell reference signal measurements when load conditions for the neighboring cell are determined to be light.

5. The apparatus of claim 1,
  wherein the neighbor reference signal interference cancellation policy selected comprises not cancelling interference estimated to be caused by a neighboring cell having colliding reference signals from serving cell reference signal measurements when load conditions for the neighboring cell are determined not to be light.

6. The apparatus of claim 1, wherein the processing element and the memory medium are further configured to cause the wireless device to:
  implement neighbor data signal interference cancellation when the load conditions for the neighboring cell are determined not to be light,
  wherein the neighbor data signal interference cancellation is not implemented when the load conditions for the neighboring cell are determined to be light.

7. The apparatus of claim 1, wherein the processing element and the memory medium are further configured to cause the wireless device to:
  evaluate the determined load conditions for the neighboring cell over a period of time to determine whether a ping-pong effect is occurring with respect to the determined load conditions for the neighboring cell,
  wherein selecting the neighbor reference signal interference cancellation policy is further based at least in part on evaluating the determined load conditions for the neighboring cell over the period of time.

8. The apparatus of claim 1,
  wherein the wireless communication link is established according to LTE,
  wherein the colliding reference signals comprise cell-specific reference signals (CRS).

9. A wireless user equipment (UE) device, comprising:
  an antenna;
  a radio operably coupled to the antenna; and
  a processing element operably coupled to the radio;
  wherein the antenna, radio and processing element are configured to:
  establish a cellular communication link with a base station, wherein the base station provides a serving cell to the wireless UE device, wherein the serving cell provides cell-specific reference signals (CRS);
  determine CRS provided by a neighbor cell, wherein the neighbor cell is a colliding CRS neighbor to the serving cell such that all CRS resource elements for the serving cell collide with CRS resource elements for the neighbor cell;
  determine a channel quality index (CQI) value and a rank indicator (RI) value for the serving cell based at least in part on the CRS provided by the serving cell;
  estimate an expected spectral efficiency using the CQI value and the RI value;
  receive a modulation and coding scheme (MCS) assignment from the base station;
  estimate an actual spectral efficiency using the MCS assignment;
  perform a comparison using the estimated expected spectral efficiency and the estimated actual spectral efficiency;
  determine that load conditions for the neighbor cell are light if the estimated actual spectral efficiency is greater than the estimated expected spectral efficiency by at least a first threshold and if interference cancellation on the CRS provided by the serving cell to cancel interference from the CRS provided by the neighbor cell is not currently enabled; and
  enable interference cancellation on the CRS provided by the serving cell to cancel interference from the CRS provided by the neighbor cell when load conditions for the neighbor cell are determined to be light.

10. The wireless UE device of claim 9, wherein the wireless UE device is further configured to:
  determine that load conditions for the neighbor cell are not light if the estimated actual spectral efficiency is not greater than the estimated expected spectral efficiency by at least the first threshold and if interference cancellation on the CRS provided by the serving cell to cancel interference from the CRS provided by the neighbor cell is not currently enabled;
  determine that load conditions for the neighbor cell are not light if the estimated expected spectral efficiency is greater than the estimated actual spectral efficiency by at least a second threshold and if interference cancellation on the CRS provided by the serving cell to cancel interference from the CRS provided by the neighbor cell is currently enabled; and determine that load conditions for the neighbor cell are light if the estimated expected spectral efficiency is not greater than the estimated actual spectral efficiency by at least the second threshold and if interference cancellation on the CRS provided by the serving cell to cancel interference from the CRS provided by the neighbor cell is currently enabled.

11. The wireless UE device of claim 9, wherein the wireless UE device is further configured to:

provide a channel quality report for the cellular communication link to the base station;

wherein the channel quality report is prepared using the CRS provided by the serving cell with interference from the CRS provided by the neighbor cell cancelled when load conditions for the neighbor cell are determined to be light;

wherein the channel quality report is prepared using the CRS provided by the serving cell without interference from the CRS provided by the neighbor cell cancelled when load conditions for the neighbor cell are not determined to be light.

12. The wireless UE device of claim 9, wherein the estimated actual spectral efficiency is estimated using a lookup table based on the MCS assignment.

13. The wireless UE device of claim 9, wherein the estimated actual spectral efficiency is calculated using resource elements assigned, transport block size assigned, and modulation order assigned to the wireless UE device for one or more downlink data transmission grants.

14. The wireless UE device of claim 9, wherein the wireless UE device is further configured to:

evaluate the determined load conditions for the neighboring cell over a period of time to determine whether a ping-pong effect is occurring with respect to the determined load conditions for the neighboring cell, wherein enabling interference cancellation on the CRS provided by the serving cell to cancel interference from the CRS provided by the neighbor cell is further based at least in part on evaluating the determined load conditions for the neighboring cell over the period of time.

15. A method for a wireless user equipment (UE) device, the method comprising:

establishing a wireless communication link with a base station, wherein the base station provides a serving cell to the wireless UE device;

receiving reference signals from the base station;

determining that at least one neighboring cell has colliding reference signals with the reference signals received from the base station;

determining a channel quality index (CQI) value and a rank indicator (RI) value for the serving cell based at least in part on cell-specific reference signals (CRS) provided by the serving cell;

estimating an expected spectral efficiency using the CQI value and the RI value;

receiving a modulation and coding scheme (MCS) assignment from the base station;

estimating an actual spectral efficiency using the MCS assignment;

performing a comparison using the estimated expected spectral efficiency and the estimated actual spectral efficiency;

determining that load conditions for the neighboring cell are not light if the estimated actual spectral efficiency is not greater than the estimated expected spectral efficiency by at least the first threshold and if interference cancellation on the CRS provided by the serving cell to cancel interference from the CRS provided by the neighboring cell is not currently enabled; and determining whether to modify the reference signals received from the base station to reduce interference effects from the colliding reference signals based at least in part on the determined load conditions for the neighboring cell.

16. The method of claim 15, the method further comprising:

modifying the reference signals received from the base station to reduce interference effects from the colliding reference signals, and providing a channel quality report to the base station, wherein the channel quality report is prepared using the reference signals received from the base station after the modification to reduce interference effects from the colliding reference signals.

17. The method of claim 15, the method further comprising:

modifying the reference signals received from the base station to reduce interference effects from the colliding reference signals;

estimating channel noise and interference power using the reference signals received from the base station after the modification to reduce interference effects from the colliding reference signals;

receiving data signals from the base station; and performing demodulation of the data signals using the estimated channel noise and interference power.

18. The method of claim 15, the method further comprising: determining whether to enable a neighbor data signal cancellation scheme based at least in part on the determined load conditions for the neighboring cell.

19. The method of claim 15, wherein the reference signals received from the base station are not modified if the load conditions for the neighboring cell are determined to be in a heavy load condition state, wherein the reference signals received from the base station are modified to remove interference effects from the colliding reference signals if the load conditions for the neighboring cell are determined to be in a light load condition state.

20. The method of claim 15, wherein the estimated actual spectral efficiency is estimated using a lookup table based on the MCS assignment.

* * * * *